(12) United States Patent
Li et al.

(10) Patent No.: US 10,999,746 B2
(45) Date of Patent: May 4, 2021

(54) METHOD FOR MANAGING BEAM GROUPS, BASE STATION, AND TERMINAL

(71) Applicant: Yulong Computer Telecommunication Scientific (Shenzhen) Co., Ltd., Guangdong (CN)

(72) Inventors: Mingju Li, Guangdong (CN); Yunfei Zhang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/476,548

(22) PCT Filed: Jan. 23, 2018

(86) PCT No.: PCT/CN2018/073797
§ 371 (c)(1),
(2) Date: Jul. 8, 2019

(87) PCT Pub. No.: WO2018/141216
PCT Pub. Date: Aug. 9, 2018

(65) Prior Publication Data
US 2020/0169896 A1 May 28, 2020

(30) Foreign Application Priority Data

Feb. 3, 2017 (CN) .......................... 201710063428.4

(51) Int. Cl.
*H04W 16/28* (2009.01)
*H04B 17/318* (2015.01)
(Continued)

(52) U.S. Cl.
CPC .......... *H04W 16/28* (2013.01); *H04B 17/318* (2015.01); *H04W 24/10* (2013.01); *H04W 56/001* (2013.01); *H04W 72/046* (2013.01)

(58) Field of Classification Search
CPC .. H04B 7/0695; H04B 7/0408; H04B 17/318; H04J 11/0069; H04W 16/28; H04W 24/10; H04W 36/0058; H04W 36/0051; H04W 36/0083; H04W 72/046; H04W 56/001; H04W 72/042
(Continued)

(56) References Cited

U.S. PATENT DOCUMENTS

2016/0241322 A1* 8/2016 Son .................. H04W 72/046
2019/0335517 A1* 10/2019 Reial .................. H04W 16/28
(Continued)

FOREIGN PATENT DOCUMENTS

CN 102868477 A 1/2013
CN 105453629 A 3/2016
(Continued)

*Primary Examiner* — Harun Chowdhury

(57) ABSTRACT

A method for managing beam groups, applicable to a base station and a terminal, is provided. The method includes the following. Multiple beams are divided into at least one beam group. Downlink transmission content is transmitted to a terminal via at least one beam of the at least one beam group carrying the downlink transmission content. And the terminal is informed of parameter information of the at least one beam of the at least one beam group. A terminal is also provided.

10 Claims, 6 Drawing Sheets

(51) Int. Cl.
*H04W 24/10* (2009.01)
*H04W 56/00* (2009.01)
*H04W 72/04* (2009.01)

(58) Field of Classification Search
USPC .................. 370/252, 329, 350, 331, 332
See application file for complete search history.

(56) References Cited

U.S. PATENT DOCUMENTS

2020/0068462 A1* 2/2020 Zetterberg ............ H04W 16/28
2020/0084678 A1* 3/2020 Gunnarsson .......... H04W 24/10

FOREIGN PATENT DOCUMENTS

CN 106851675 A 6/2017
WO 2016138655 A1 9/2016

* cited by examiner

METHOD FOR MANAGING BEAM GROUPS, BASE STATION, AND TERMINAL

CROSS-REFERENCE TO RELATED APPLICATION(S)

This application is a 371 application of International Patent Application No. PCT/CN2018/073797, filed on Jan. 23, 2018, which claims priority to Chinese Patent Application No. 201710063428.4, filed on Feb. 3, 2017, the entire disclosures of both of which are hereby incorporated by reference.

TECHNICAL FIELD

This disclosure relates to the field of communication technologies, and more particularly to a method for managing beam groups, a base station, and a terminal.

BACKGROUND

In the long term evolution (LTE) of the prior art, reference signals transmitted by a base station for mobility management are all transmitted via a single beam, the antenna is omnidirectional, coverage of the base station is large enough because a carrier frequency is low. In new radio (NR), however, when a high frequency is used, the coverage is small due to high frequency path loss, high penetration loss, and the like. In order to expand the coverage, the base station needs to adopt a multi-beam transmission method to transmit reference signals for mobility management. For example, received signal strength of a neighboring cell and a local cell or received signal quality of the neighboring cell and the local cell is measured and compared by a user, then, whether cell switching is required is further determined, because signals in the LTE of the prior art are all omnidirectional transmission and only one signal is used in each cell, it is only necessary to measure a signal and perform comparison between cells. However, in the NR, there are multiple beams, which signal(s) needs to be measured and how to formulate the switching criteria become an urgent problem to be solved.

SUMMARY

The present disclosure aims to solve at least one of technical problems existing in the prior art or related art.

To this end, an object of the present disclosure is to provide a method for managing beam groups.

Another object of the present disclosure is to provide a base station.

Still another object of the present disclosure is to provide a method for managing beam groups.

Yet another object of the present disclosure is to provide a terminal.

In view of the above, according to an object of the present disclosure, a method for managing beam groups is provided. The method is applicable to a base station. The method includes the following. Multiple beams are divided into at least one beam group. Downlink transmission content is transmitted to a terminal via at least one beam of the at least one beam group carrying the downlink transmission content. Inform the terminal of parameter information of the at least one beam of the at least one beam group.

According to the method for managing beam groups provided by the present disclosure, the base station divides all beams into multiple beam groups, transmits the downlink transmission content to the terminal via at least one beam of at least one beam group carrying the downlink transmission content, and informs the terminal of parameter information of the at least one beam of the at least one beam group divided, so that the terminal calculates cell measure quality and reports a measure result or selects a target cell, according to the parameter information and the beam groups. According to the present disclosure, multiple beams are divided into one group by means of beam groups, a calculation of cell measure quality is performed for one beam selected in each group, and a measure result is reported or a target cell is selected, so that cells in which mobility/measurement reference signals are transmitted at different beam widths can fairly participate in an operation of selecting a target cell, which further improves user performance. The downlink transmission content includes all downlink transmission synchronization signals, reference signals, physical broadcast channel (PBCH), physical downlink control channel (PDCCH), physical downlink shared channel (PDSCH), and the like in new radio (NR). The synchronization signal includes a primary synchronization signal (PSS), a secondary synchronization signal (SSS), a newly defined third synchronization signal (TSS), or the like in the NR. The reference signal includes a cell specific reference signal, a channel state information (CSI) reference signal, a demodulation reference signal (DMRS) or a mobility/measurement reference signal (MRS), and the like.

According to the present disclosure, the method for managing beam groups may include the following technical features.

In the above technical solution, as an implementation, the beams are divided into the at least one beam group as follows. A total coverage area of the base station is divided into a preset number of partial coverage areas. Beams within the same partial coverage area are taken as one beam group.

In this technical solution, the base station specifies which beams belong to the same beam group. Specifically, by dividing the total coverage area of the base station into a preset number of small partial coverage areas, the beams within the same small partial coverage area are taken as the same beam group. As an example, the total coverage area covers 360 degrees and is divided into six groups, that is, the total coverage area is divided into six partial coverage areas, and beams within the same 60-degree partial coverage area are grouped into the same beam group. The total coverage area is divided to correspond to multiple beam groups, and a beam is selected in the beam group to participate in an operation of calculating cell measure quality or reporting a measure result, so that the most suitable target cell can be selected, which improves user throughput and reduces delay.

In any of the foregoing technical solutions, as an implementation, inform the terminal of the parameter information of the at least one beam of the at least one beam group as follows. Inform the terminal of the parameter information of the at least one beam of the at least one beam group through a primary synchronization signal, a secondary synchronization signal, a physical broadcast channel, a beam reference signal, a third synchronization signal, and a mobility/measurement reference signal in the NR, and one or more signals in system information, or relative positions of time-frequency resources between the above one or more signals.

In this technical solution, inform the terminal of the parameter information of the at least one beam of the at least one beam group through the primary synchronization signal, the secondary synchronization signal, the physical broadcast channel, the beam reference signal, the third synchronization signal, and the mobility/measurement reference signal in the NR, and the one or more signals in the system information, or the relative positions of the time-frequency resources between the above one or more signals, so that the terminal can obtain the parameter information.

In any of the foregoing technical solutions, as an implementation, the parameter information includes a beam-group identifier; or one or more received signal strength deviation values or received signal quality deviation values.

In this technical solution, the parameter information notified to the terminal includes the beam-group identifier, or the one or more received signal strength deviation values or received signal quality deviation values. The terminal knows which beams belong to the same beam group by informing the terminal of the beam-group identifier; by informing the terminal of the one or more received signal strength deviation values or received signal quality deviation values, the terminal can divide all beams in each cell into at least one beam group according to the one or more received signal strength deviation values or received signal quality deviation values; and the terminal selects, in each of the at least one beam group, a beam having the strongest received signal strength or the highest received signal quality to calculate cell measure quality or perform measure reporting. Thereby, the fairness of the selection of a target cell can be improved. As an implementation, the deviation value above can be given by system information.

In any of the foregoing technical solutions, as an implementation, a partial coverage area corresponding to each beam group of all base stations on the same carrier frequency is consistent.

In this technical solution, the definitions of beam groups on the same carrier frequency should be the same. In the case of a certain carrier frequency, if measure quality for each cell is obtained by calculating measurement values of up to Nbeams or the measurement values of up to N beams can be reported for each cell, the size of each partial coverage area can be obtained by dividing a total coverage area by N. For example, the total coverage area covers 360 degrees, and the measure quality for each cell is obtained by calculating measurement values of six beams at most. Then, partial coverage areas corresponding to beam groups of all base stations on the same carrier frequency each cover 60 degrees, that is, beams within the same 60-degree coverage area are grouped into the same beam group. As an implementation, partial coverage areas of different carrier frequencies may be different.

According to another object of the present disclosure, a base station is provided. The base station includes a dividing unit, a transmitting unit, and an informing unit. The dividing unit is configured to divide multiple beams into at least one beam group. The transmitting unit is configured to transmit downlink transmission content to a terminal via at least one beam of the at least one beam group carrying the downlink transmission content. The informing unit is configured to inform the terminal of parameter information of the at least one beam of the at least one beam group.

According to the base station provided by the present disclosure, the dividing unit of the base station divides all beams into multiple beam groups, the transmitting unit of the base station transmits the downlink transmission content to the terminal via at least one beam of at least one beam group carrying the downlink transmission content, and the informing unit of the base station informs the terminal of the parameter information of the at least one beam of the at least one beam group divided, so that the terminal calculates cell measure quality and reports a measure result or selects a target cell according to the parameter information and the beam groups. According to the present disclosure, multiple beams are divided into one group by means of beam groups, a calculation of cell measure quality is performed for one beam selected in each group, and a measure result is reported or a target cell is selected, so that cells in which mobility/measurement reference signals are transmitted at different beam widths can fairly participate in an operation of selecting a target cell, which further improves user performance. The downlink transmission content includes all downlink synchronization signals, reference signals, PBCH, PDCCH, PDSCH, and the like in the NR. The synchronization signal includes a primary synchronization signal, a secondary synchronization signal, a newly defined third synchronization signal, or the like in the NR. The reference signal includes a cell specific reference signal, a CSI reference signal, a demodulation reference signal or a mobility/measurement reference signal, and the like.

According to the present disclosure, the base station may include the following technical features.

In the above technical solution, as an implementation, the dividing unit is configured to divide a total coverage area of the base station into a preset number of partial coverage areas, and to take beams within the same partial coverage area as one beam group.

In this technical solution, the base station specifies which beams belong to the same beam group. Specifically, the dividing unit of the base station divides the total coverage area of the base station into a preset number of small partial coverage areas, and takes the beams within the same small partial coverage area as the same beam group. For instance, the total coverage area covers 360 degrees and is divided into six groups, that is, the total coverage area is divided into six partial coverage areas, and beams within the same 60-degree partial coverage area are grouped into the same beam group. The total coverage area is divided to correspond to multiple beam groups, and a beam is selected in the beam group to participate in an operation of calculating cell measure quality or reporting a measure result, so that the most suitable target cell can be selected, which improves user throughput and reduces delay.

In any of the foregoing technical solutions, as an implementation, the informing unit is configured to inform the terminal of the parameter information of the at least one beam of the at least one beam group through a primary synchronization signal, a secondary synchronization signal, a physical broadcast channel, a beam reference signal, a third synchronization signal, and a mobility/measurement reference signal in the NR, and one or more signals in system information, or relative positions of time-frequency resources between the above one or more signals.

In this technical solution, inform the terminal of the parameter information of the at least one beam of the at least one beam group through the primary synchronization signal, the secondary synchronization signal, the physical broadcast channel, the beam reference signal, the third synchronization signal, and the mobility/measurement reference signal in the NR, and the one or more signals in the system information, or the relative positions of the time-frequency resources between the above one or more signals, so that the terminal can obtain the parameter information.

In any of the foregoing technical solutions, as an implementation, the parameter information includes a beam-group identifier; or one or more received signal strength deviation values or received signal quality deviation values.

In this technical solution, the parameter information notified to the terminal includes the beam-group identifier, or the one or more received signal strength deviation values or received signal quality deviation values. The terminal knows which beams belong to the same beam group by informing the terminal of the beam-group identifier; by informing the terminal of the one or more received signal strength deviation values or received signal quality deviation values, the terminal can divide all beams in each cell into at least one beam group according to the one or more received signal strength deviation values or received signal quality deviation values; and the terminal selects, in each of the at least one beam group, a beam having the strongest received signal strength or the highest received signal quality to calculate cell measure quality or perform measure reporting. Thereby, the fairness of the selection of a target cell can be improved. As an implementation, the deviation value above can be given by system information.

In any of the foregoing technical solutions, as an implementation, a partial coverage area corresponding to each beam group of all base stations on the same carrier frequency is consistent.

In this technical solution, the definitions of beam groups on the same carrier frequency should be the same. In the case of a certain carrier frequency, if measure quality for each cell is obtained by calculating measurement values of up to N beams or the measurement values of up to N beams are to be reported for each cell, the size of each partial coverage area can be obtained by dividing a total coverage area by N. For instance, the total coverage area covers 360 degrees, and the measure quality for each cell is obtained by calculating measurement values of six beams at most. Then, partial coverage areas corresponding to beam groups of all base stations on the same carrier frequency each cover 60 degrees, that is, beams within the same 60-degree coverage area are grouped into the same beam group. As an implementation, partial coverage areas of different carrier frequencies may be different.

According to still another object of the present disclosure, a method for managing beam groups is provided. The method is applicable to a terminal. The method includes the following. Received signal strength or received signal quality of mobility/measurement reference signals of all beams is measured. According to different cells, all the beams are grouped in accordance with a synchronization signal sequence of each beam. Parameter information of each of all beams in each cell is received. According to the parameter information, all the beams in each cell are divided into at least one beam group. A beam having the strongest received signal strength or the highest received signal quality in each of the at least one beam group is selected to calculate measure quality or perform measure reporting in each cell.

According to the method for managing beam groups provided by the present disclosure, the terminal measures the received signal strength or the received signal quality of the mobility/measurement reference signals of all beams; the terminal groups, according to different cells, all the beams in accordance with the synchronization signal sequence of each beam; the terminal receives the parameter information of each of all beams in each cell; the terminal divides, according to the parameter information, all the beams into multiple beam groups; and the terminal selects, in each beam group, the beam having the strongest received signal strength or the highest received signal quality to calculate cell measure quality or perform measure reporting. Further, a target cell can be selected, and cells in which mobility/measurement reference signals are transmitted at different beam widths can fairly participate in an operation of selecting a target cell, thereby, a best target cell can be selected for a user, which further improves user performance. The mobility/measurement reference signal includes a primary synchronization signal, a secondary synchronization signal, a mediation reference signal for physical broadcast channel demodulation, a beam reference signal, a third synchronization signal, and a CSI reference signal or other newly defined mobility/measurement reference signal in NR.

According to the present disclosure, the method for managing beam groups may include the following technical features.

In the above technical solution, as an implementation, the parameter information includes a beam-group identifier; or one or more received signal strength deviation values or received signal quality deviation values.

In this technical solution, the parameter information includes the beam-group identifier, or the one or more received signal strength deviation values or received signal quality deviation values. The terminal knows which beams belong to the same beam group according to the beam-group identifier, can divide all beams in each cell into at least one beam group according to the one or more received signal strength deviation values or received signal quality deviation values, and selects, in each beam group, a beam having the strongest received signal strength or the highest received signal quality to calculate cell measure quality or perform measure reporting. Thereby, the fairness of the selection of a target cell can be improved. As an implementation, the deviation value above can be given by system information.

In any of the foregoing technical solutions, as an implementation, when the parameter information is a beam-group identifier, all the beams in each cell are divided according to the parameter information into at least one beam group as follows. Beams having the same beam-group identifier in each cell are divided into the same beam group according to a beam-group identifier carried by each of all the beams.

In this technical solution, when the parameter information is the beam-group identifier, the beams having the same beam-group identifier in each cell are divided into the same beam group according to the beam-group identifier carried by each beam. Which beams belong to the same beam group is determined according to the beam-group identifier. One beam having the strongest received beam strength or the highest received signal quality in one beam group is selected to calculate measure quality or perform measure reporting in each cell, which avoids the unfairness in calculating or reporting reference signal strength for multiple beams which have the strongest received signal strength or the highest received signal quality and are directly selected.

In any of the foregoing technical solutions, as an implementation, when the parameter information is one or more received signal strength deviation values or received signal quality deviation values, all the beams in each cell are divided according to the parameter information into at least one beam group as follows. Among all beams measured, a beam having the strongest received signal strength or the highest received signal quality is selected as a current strongest beam. All beams and the current strongest beam are combined into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value. When at least one remaining beam that does not form a beam group exists, a beam having the strongest received signal strength or the highest received signal quality in the least one remaining beam is selected as the current strongest beam, all beams and the current strongest beam in the at least one remaining beam are combined into another beam group, where a difference between received signal strength of each of all the beams and the received signal strength of the current strongest beam in the at least one remaining beam is within a range of the received signal strength deviation value or a difference between received signal quality of each of all the beams and the received signal quality of the current strongest beam in the at least one remaining beam is within a range of the received signal quality deviation value, and this step is repeated until there is no remaining beam.

In this technical solution, when the parameter information is the one or more received signal strength deviation values or received signal quality deviation values, the beam having the strongest received signal strength or the highest received signal quality among all the beams is selected as the current strongest beam. All beams and the current strongest beam are combined into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value. When at least one ungrouped beam exists, the beam having the strongest received signal strength or the highest received signal quality in the at least one ungrouped beam is selected as the current strongest beam, all beams and the current strongest beam in the at least one ungrouped beam are combined into another beam group, where a difference between received signal strength of each of all the beams and the received signal strength of the current strongest beam in the at least one ungrouped beam is within a range of the received signal strength deviation value or a difference between received signal quality of each of all the beams and the received signal quality of the current strongest beam in the at least one ungrouped beam is within a range of the received signal quality deviation value, and an operation of grouping at least one ungrouped beam is repeated until there is no remaining beam. Because differences between received signal strength or received signal quality of beams in the same beam group are not significant, all beams are divided into several beam groups according to differences between received signal strength or received signal quality of the beams, and a beam having the strongest received signal strength or the highest received signal quality is selected from each beam group to calculate cell measure quality or perform measure reporting, which avoids the case where many beams having strong received signal strength or high received signal quality can be selected in a certain cell, or the case where fewer beams having strong received signal strength or high received signal quality can be selected in a certain cell, therefore, a target cell can be selected more fairly, and so a best target cell is selected for the user, which further improves user throughput and reduces delay.

In any of the foregoing technical solutions, as an implementation, the received signal strength deviation values or the received signal quality deviation values on the same carrier frequency are the same.

In this technical solution, the received signal strength deviation values or the received signal quality deviation values adopted by all base stations on the same carrier frequency are the same, and the received signal strength deviation values or the received signal quality deviation values adopted by all base stations on different carrier frequencies may be different.

According to yet another object of the present disclosure, a terminal is provided. The terminal includes a measuring unit, a grouping unit, a receiving unit, a dividing unit, and a reporting unit. The measuring unit is configured to measure received signal strength or received signal quality of mobility/measurement reference signals of all beams. The grouping unit is configured to group, according to different cells, all the beams in accordance with a synchronization signal sequence of each beam. The receiving unit is configured to receive parameter information of each of all beams in each cell. The dividing unit is configured to divide, according to the parameter information, all the beams in each cell into at least one beam group. The reporting unit is configured to select, in each of the at least one beam group, a beam having the strongest received signal strength or the highest received signal quality to calculate measure quality or perform measure reporting in each cell.

According to the terminal provided by the present disclosure, the measuring unit of the terminal measures the received signal strength or the received signal quality of the mobility/measurement reference signals of all beams; the grouping unit of the terminal groups, according to different cells, all the beams in accordance with the synchronization signal sequence of each beam; the receiving unit of the terminal receives parameter information of each of all beams in each cell; the dividing unit of the terminal divides, according to the parameter information, all the beams in each cell into multiple beam groups; and the reporting unit of the terminal selects, in each beam group, the beam having the strongest received signal strength or the highest received signal quality to calculate cell measure quality or perform measure reporting. According to the present disclosure, the beam having the strongest signal strength or the highest received signal quality is selected in the divided beam groups. Further, a target cell can be selected, and cells in which mobility/measurement reference signals are transmitted at different beam widths can fairly participate in an operation of selecting a target cell, and so a best target cell can be selected for a user, which further improves user performance. The mobility/measurement reference signal includes a primary synchronization signal, a secondary synchronization signal, a mediation reference signal for physical broadcast channel demodulation, a beam reference signal, a third synchronization signal, and a CSI reference signal or other newly defined mobility/measurement reference signal in NR.

According to the present disclosure, the terminal may include the following technical features.

In the above technical solution, as an implementation, the parameter information includes a beam-group identifier; or one or more received signal strength deviation values or received signal quality deviation values.

In this technical solution, the parameter information includes the beam-group identifier, or the one or more received signal strength deviation values or received signal quality deviation values. The terminal knows which beams belong to the same beam group according to the beam-group identifier, can divide all beams in each cell into at least one beam group according to the one or more received signal strength deviation values or received signal quality deviation values, and selects, in each beam group, a beam having the strongest received signal strength or the highest received signal quality to calculate cell measure quality or perform measure reporting. Thereby, the fairness of the selection of a target cell can be improved. As an implementation, the deviation value above can be given by system information.

In any of the foregoing technical solutions, as an implementation, when the parameter information is a beam-group identifier, the dividing unit is configured to divide beams having the same beam-group identifier in each cell into the same beam group according to a beam-group identifier carried by each of all the beams.

In this technical solution, when the parameter information is the beam-group identifier, the dividing unit divides the beams having the same beam-group identifier in each cell into the same beam group according to the beam-group identifier carried by each of all the beams. Which beams belong to the same beam group is determined according to the beam-group identifier. One beam having the strongest received signal strength or the highest received signal quality in one beam group is selected to calculate measure quality or perform measure reporting in each cell, which avoids the unfairness in calculating or reporting reference signal strength for multiple beams which have the strongest received signal strength or the highest received signal quality and are directly selected.

In any of the foregoing technical solutions, as an implementation, when the parameter information is one or more received signal strength deviation values or received signal quality deviation values, the dividing unit is configured to: select, among measured beams to-be-measured, a beam having the strongest received signal strength or the highest received signal quality as a current strongest beam; combine all beams and the current strongest beam into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value; select, in at least one remaining beam, a beam having the strongest received signal strength or the highest received signal quality as the current strongest beam, and combine all beams and the current strongest beam in the at least one remaining beam into another beam group, where a difference between received signal strength of each of all the beams and the received signal strength of the current strongest beam in the at least one remaining beam is within a range of the received signal strength deviation value or a difference between received signal quality of each of all the beams and the received signal quality of the current strongest beam in the at least one remaining beam is within a range of the received signal quality deviation value, when the at least one remaining beam that does not form a beam group exists; and repeat this step until there is no remaining beam.

In this technical solution, when the parameter information is the one or more received signal strength deviation values or received signal quality deviation values, the dividing unit selects the beam having the strongest received signal strength or the highest received signal quality among all the beams as the current strongest beam. The dividing unit combines all beams and the current strongest beam into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value. When at least one ungrouped beam exists, the dividing unit selects, in the at least one ungrouped beam, the beam having the strongest received signal strength or the highest received signal quality as the current strongest beam, combines all beams and the current strongest beam in the at least one ungrouped beam into another beam group, where a difference between received signal strength of each of all the beams and the received signal strength of the current strongest beam in the at least one ungrouped beam is within a range of the received signal strength deviation value or a difference between received signal quality of each of all the beams and the received signal quality of the current strongest beam in the at least one ungrouped beam is within a range of the received signal quality deviation value, and an operation of grouping at least one ungrouped beam is repeated until there is no remaining beam. Because differences between received signal strength or received signal quality of beams in the same beam group are not significant, all beams are divided into several beam groups according to differences between received signal strength or received signal quality of the beams, and a beam having the strongest received signal strength or the highest received signal quality is selected from each beam group to calculate cell measure quality or perform measure reporting, which avoids the case where many beams having strong received signal strength or high received signal quality can be selected in a certain cell, or the case where fewer beams having strong received signal strength or high received signal quality can be selected in a certain cell, therefore, a target cell can be selected more fairly, and so a best target cell is selected for the user, which further improves user throughput and reduces delay.

In any of the foregoing technical solutions, as an implementation, the received signal strength deviation values or the received signal quality deviation values on the same carrier frequency are the same.

In this technical solution, the received signal strength deviation values or the received signal quality deviation values adopted by all base stations on the same carrier frequency are the same, and the received signal strength deviation values or the received signal quality deviation values adopted by all base stations on different carrier frequencies may be different.

Additional aspects and advantages of the disclosure will be apparent with reference to the following descriptions or be understood through the practice of the present disclosure.

BRIEF DESCRIPTION OF THE DRAWINGS

The foregoing and/or additional aspects and advantages of the present disclosure will be readily apparent from the following description of the implementations taken in conjunction with the accompanying drawings, where.

DETAILED DESCRIPTION

To understand the above objects, features, and advantages of the present disclosure more clearly, the present disclosure will be further described in detail below with reference to accompanying drawings and specific implementations. It should be noted that implementations of the present disclosure and the features in the implementations may be combined with each other without conflict.

In the following description, numerous specific details are set forth in order to provide a thorough understanding of the disclosure. However, the disclosure may be practiced in other ways other than those described herein. Therefore, the scope of the disclosure is not limited to the specific implementations disclosed below.

Figure 1:
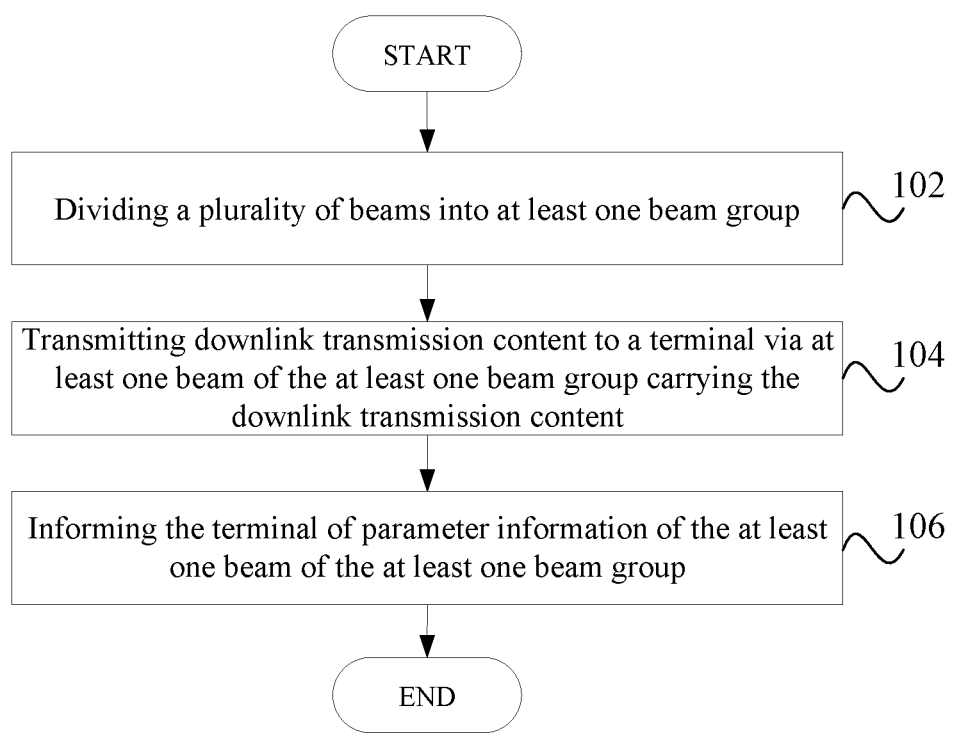
FIG. 1 is a schematic flow diagram illustrating a method for managing beam groups applicable to a base station according to an implementation of the present disclosure.

In implementations of a first aspect of the present disclosure, a method for managing beam groups is provided. The method is applicable to a base station. FIG. 1 is a schematic flow diagram illustrating a method for managing beam groups applicable to the base station according to an implementation of the present disclosure.

At 102, multiple beams are divided into at least one beam group.

At 104, downlink transmission content is transmitted to a terminal via at least one beam of the at least one beam group carrying the downlink transmission content.

At 106, inform the terminal of parameter information of the at least one beam of the at least one beam group.

According to the method for managing beam groups provided by the present disclosure, the base station divides all beams into multiple beam groups, transmits the downlink transmission content to the terminal via at least one beam of at least one beam group carrying the downlink transmission content, and informs the terminal of parameter information of the at least one beam of the at least one beam group divided, so that the terminal calculates cell measure quality and reports a measure result or selects a target cell according to the parameter information and the beam groups. According to the present disclosure, multiple beams are divided into one group by means of beam groups, a calculation of cell measure quality is performed for one beam selected in each group, and a measure result is reported or a target cell is selected, so that cells in which mobility/measurement reference signals are transmitted at different beam widths can fairly participate in an operation of selecting a target cell, which further improves user performance. The downlink transmission content includes all downlink synchronization signals, reference signals, physical broadcast channel (PBCH), physical downlink control channel (PDCCH), physical downlink shared channel (PDSCH), and the like in new radio (NR). The synchronization signal includes a primary synchronization signal (PSS), a secondary synchronization signal (SSS), a newly defined third synchronization signal (TSS), or the like in the NR. The reference signal includes a cell specific reference signal, a channel state information (CSI) reference signal, a demodulation reference signal (DMRS) or a mobility/measurement reference signal (MRS), and the like.

Figure 2:
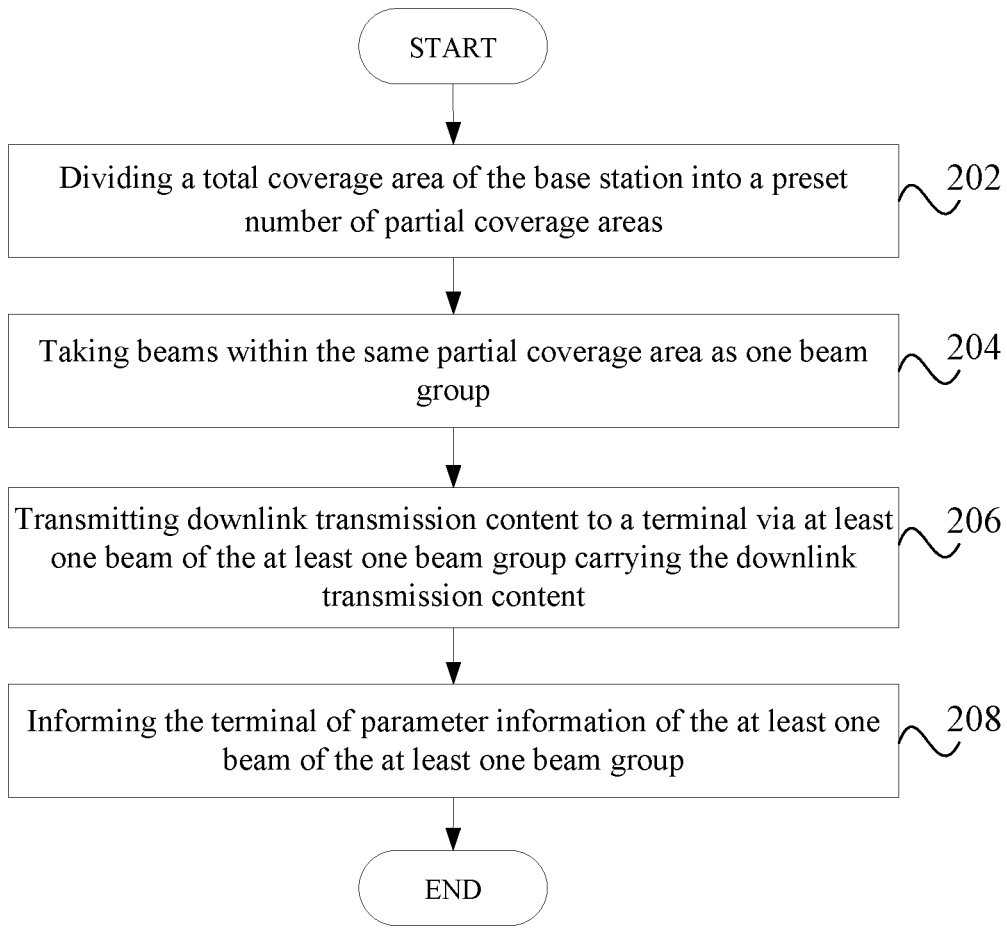
FIG. 2 is a schematic flow diagram illustrating a method for managing beam groups applicable to a base station according to another implementation of the present disclosure.

FIG. 2 is a schematic flow diagram illustrating a method for managing beam groups applicable to a base station according to another implementation of the present disclosure.

At 202, a total coverage area of the base station is divided into a preset number of partial coverage areas.

At 204, beams within the same partial coverage area are taken as one beam group.

At 206, downlink transmission content is transmitted to a terminal via at least one beam of the at least one beam group carrying the downlink transmission content.

At 208, inform the terminal of parameter information of the at least one beam of the at least one beam group.

In this implementation, the base station specifies which beams belong to the same beam group. Specifically, by dividing the total coverage area of the base station into a preset number of small partial coverage areas, the beams within the same small partial coverage area are taken as the same beam group. For example, the total coverage area covers 360 degrees and is divided into six groups, that is, the total coverage area is divided into six partial coverage areas, and beams within the same 60-degree partial coverage area are grouped into the same beam group. The total coverage area is divided to correspond to multiple beam groups, and a beam is selected in the beam group to participate in an operation of calculating cell measure quality or reporting a measure result, so that the most suitable target cell can be selected, which improves user throughput and reduces delay.

In one implementation of the present disclosure, inform the terminal of the parameter information of the at least one beam of the at least one beam group as follows. Inform the terminal of the parameter information of the at least one beam of the at least one beam group through a primary synchronization signal, a secondary synchronization signal, a physical broadcast channel, a beam reference signal, a third synchronization signal, and a mobility/measurement reference signal in NR, and one or more signals in system information, or relative positions of time-frequency resources between the above one or more signals.

In this implementation, inform the terminal of the parameter information of the at least one beam of the at least one beam group through the primary synchronization signal, the secondary synchronization signal, the physical broadcast channel, the beam reference signal, the third synchronization signal, and the mobility/measurement reference signal in the NR, and the one or more signals in the system information, or the relative positions of the time-frequency resources between the above one or more signals, so that the terminal can obtain the parameter information.

In one implementation of the present disclosure, the parameter information includes a beam-group identifier; or one or more received signal strength deviation values or received signal quality deviation values.

In this implementation, the parameter information notified to the terminal includes the beam-group identifier, or the one or more received signal strength deviation values or received signal quality deviation values. The terminal knows which beams belong to the same beam group by informing the terminal of the beam-group identifier; by informing the terminal of the one or more received signal strength deviation values or received signal quality deviation values, the terminal can divide all beams in each cell into at least one beam group according to the one or more received signal strength deviation values or received signal quality deviation values; and the terminal selects, in each of the at least one beam group, a beam having the strongest received signal strength or the highest received signal quality to calculate cell measure quality or perform measure reporting. Thereby, the fairness of the selection of a target cell can be improved. In one implementation, the deviation value above can be given by system information.

In one implementation of the present disclosure, a partial coverage area corresponding to each beam group of all base stations on the same carrier frequency is consistent.

In this implementation, the definitions of beam groups on the same carrier frequency should be the same. In the case of a certain carrier frequency, if measure quality for each cell is obtained by calculating measurement values of up to N beams or the measurement values of up to N beams can be reported for each cell, the size of each partial coverage area can be obtained by dividing a total coverage area by N. For example, the total coverage area covers 360 degrees, and the measure quality for each cell is obtained by calculating measurement values of six beams at most. Then, partial coverage areas corresponding to beam groups of all base stations on the same carrier frequency each cover 60 degrees, that is, beams within the same 60-degree coverage area are grouped into the same beam group. In one implementation, partial coverage areas of different carrier frequencies may be different.

Figure 3:
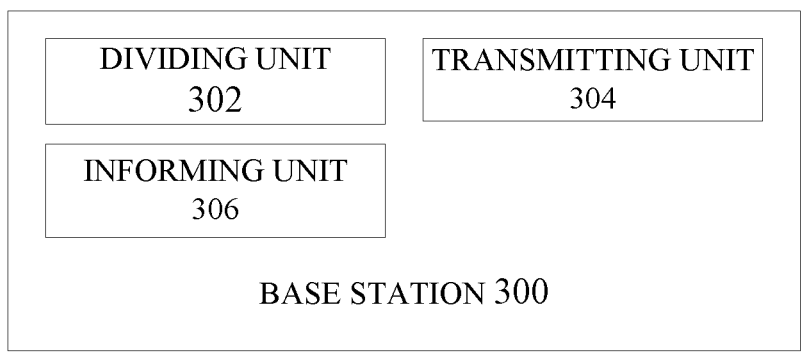
FIG. 3 is a block diagram illustrating a base station according to an implementation of the present disclosure.

In implementations of a second aspect of the present disclosure, a base station 300 is provided. FIG. 3 is a block diagram illustrating the base station 300 according to an implementation of the present disclosure.

A dividing unit 302 is configured to divide multiple beams into at least one beam group.

A transmitting unit 304 is configured to transmit downlink transmission content to a terminal via at least one beam of the at least one beam group carrying the downlink transmission content.

An informing unit 306 is configured to inform the terminal of parameter information of the at least one beam of the at least one beam group.

According to the base station 300 provided by the present disclosure, the dividing unit 302 of the base station 300 divides all beams into multiple beam groups, the transmitting unit 304 of the base station 300 transmits the downlink transmission content to the terminal via at least one beam of at least one beam group carrying the downlink transmission content, and the informing unit 306 of the base station 300 informs the terminal of the parameter information of the at least one beam of the at least one beam group divided, so that the terminal calculates cell measure quality and reports a measure result or selects a target cell according to the parameter information and the beam groups. According to the present disclosure, multiple beams are divided into one group by means of beam groups, a calculation of cell measure quality is performed for one beam selected in each group, and a measure result is reported or a target cell is selected, so that cells in which mobility/measurement reference signals are transmitted at different beam widths can fairly participate in an operation of selecting a target cell, which further improves user performance. The downlink transmission content includes all downlink synchronization signals, reference signals, PBCH, PDCCH, PDSCH, and the like in NR. The synchronization signal includes a primary synchronization signal, a secondary synchronization signal, a newly defined third synchronization signal, or the like in the NR. The reference signal includes a cell specific reference signal, a CSI reference signal, a demodulation reference signal or a mobility/measurement reference signal, and the like.

In one implementation of the present disclosure, the dividing unit 302 is configured to divide a total coverage area of the base station into a preset number of partial coverage areas, and to take beams within the same partial coverage area as one beam group.

In this implementation, the base station 300 specifies which beams belong to the same beam group. Specifically, the dividing unit 302 divides the total coverage area of the base station 300 into a preset number of small partial coverage areas, and takes the beams within the same small partial coverage area as the same beam group. For example, the total coverage area covers 360 degrees and is divided into six groups, that is, the total coverage area is divided into six partial coverage areas, and beams within the same 60-degree partial coverage area are grouped into the same beam group. The total coverage area is divided to correspond to multiple beam groups, and a beam is selected in the beam group to participate in an operation of calculating cell measure quality or reporting a measure result, so that the most suitable target cell can be selected, which improves user throughput and reduces delay.

In one implementation of the present disclosure, the informing unit 306 is configured to inform the terminal of the parameter information of the at least one beam of the at least one beam group through a primary synchronization signal, a secondary synchronization signal, a physical broadcast channel, a beam reference signal, a third synchronization signal, and a mobility/measurement reference signal in the NR, and one or more signals in system information, or relative positions of time-frequency resources between the above one or more signals.

In this implementation, inform the terminal of the parameter information of the at least one beam of the at least one beam group through the primary synchronization signal, the secondary synchronization signal, the physical broadcast channel, the beam reference signal, the third synchronization signal, and the mobility/measurement reference signal in the NR, and the one or more signals in the system information, or the relative positions of the time-frequency resources between the above one or more signals, so that the terminal can obtain the parameter information.

In one implementation of the present disclosure, the parameter information includes a beam-group identifier; or one or more received signal strength deviation values or received signal quality deviation values.

In this implementation, the parameter information notified to the terminal includes the beam-group identifier, or the one or more received signal strength deviation values or received signal quality deviation values. The terminal knows which beams belong to the same beam group by informing the terminal of the beam-group identifier; by informing the terminal of the one or more received signal strength deviation values or received signal quality deviation values, the terminal can divide all beams in each cell into at least one beam group according to the one or more received signal strength deviation values or received signal quality deviation values; and the terminal selects, in each of the at least one beam group, a beam having the strongest received signal strength or the highest received signal quality to calculate cell measure quality or perform measure reporting. Thereby, the fairness of the selection of a target cell can be improved. As an implementation, the deviation value above can be given by system information.

In one implementation of the present disclosure, a partial coverage area corresponding to each beam group of all base stations on the same carrier frequency is consistent.

In this implementation, the definitions of beam groups on the same carrier frequency should be the same. In the case of a certain carrier frequency, if measure quality for each cell is obtained by calculating measurement values of up to N beams or the measurement values of up to N beams can be reported for each cell, the size of each partial coverage area can be obtained by dividing a total coverage area by N. For instance, the total coverage area covers 360 degrees, and the measure quality for each cell is obtained by calculating measurement values of six beams at most. Then, partial coverage areas corresponding to beam groups of all base stations on the same carrier frequency each cover 60 degrees, that is, beams within the same 60-degree coverage area are grouped into the same beam group. As an implementation, partial coverage areas of different carrier frequencies may be different.

Figure 4:
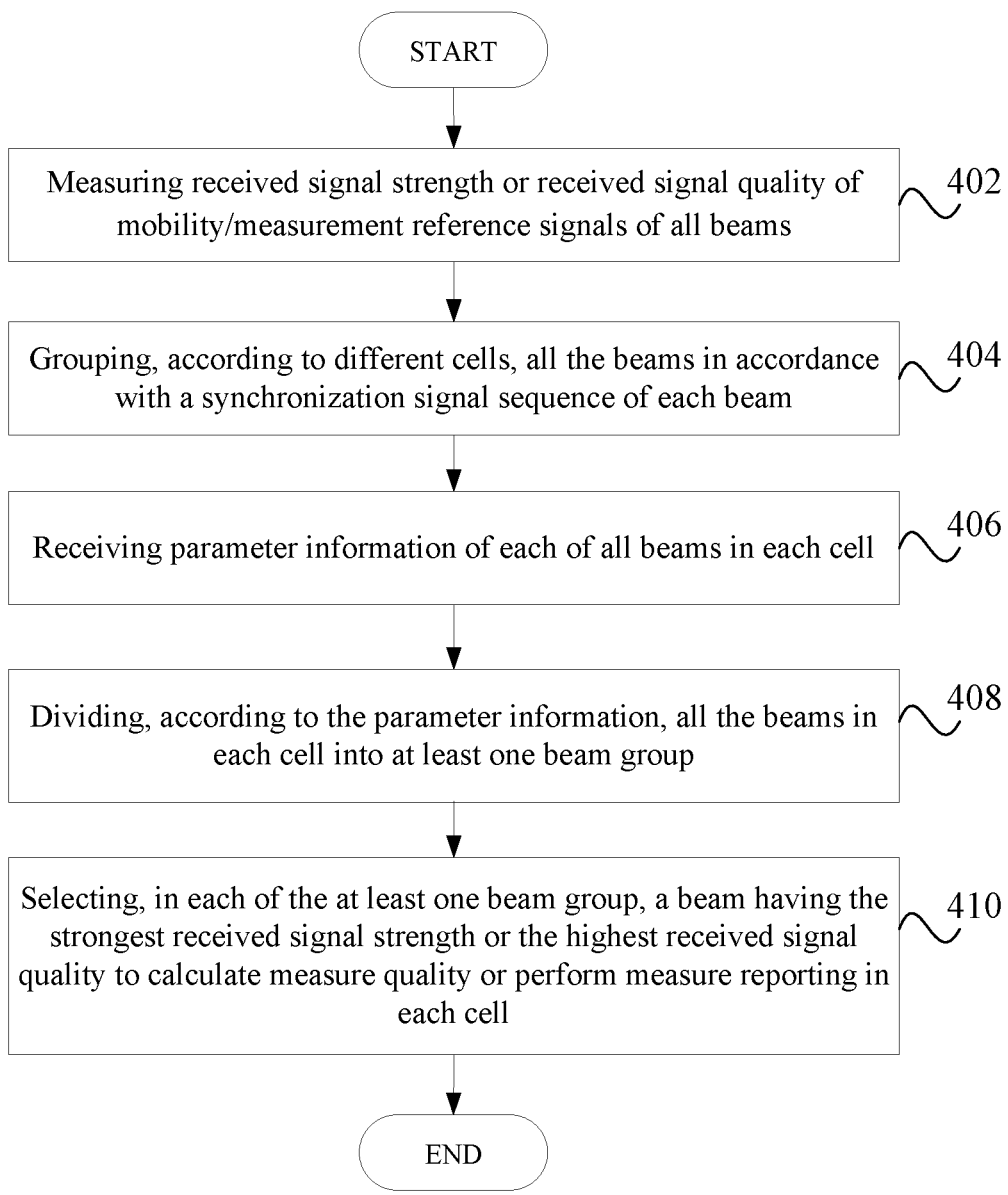
FIG. 4 is a schematic flow diagram illustrating a method for managing beam groups applicable to a terminal according to an implementation of the present disclosure.

In implementations of a third aspect of the present disclosure, a method for managing beam groups is provided. The method is applicable to a terminal. FIG. 4 is a schematic flow diagram illustrating a method for managing beam groups applicable to the terminal according to an implementation of the present disclosure.

At 402, received signal strength or received signal quality of mobility/measurement reference signals of all beams is measured.

At 404, according to different cells, all the beams are grouped in accordance with a synchronization signal sequence of each beam.

At 406, parameter information of each of all beams in each cell is received.

At 408, according to the parameter information, all the beams in each cell are divided into at least one beam group.

At 410, a beam having the strongest received signal strength or the highest received signal quality in each of the at least one beam group is selected to calculate measure quality or perform measure reporting in each cell.

According to the method for managing beam groups provided by the present disclosure, the terminal measures the received signal strength or the received signal quality of the mobility/measurement reference signals of all beams; the terminal groups, according to different cells, all the beams in accordance with the synchronization signal sequence of each beam; the terminal receives the parameter information of each of all beams in each cell; the terminal divides, according to the parameter information, all the beams into multiple beam groups; and the terminal selects, in each beam group, the beam having the strongest received signal strength or the highest received signal quality to calculate cell measure quality or perform measure reporting. Further, a target cell can be selected, and cells in which mobility/measurement reference signals are transmitted at different beam widths can fairly participate in an operation of selecting a target cell, thereby, a best target cell can be selected for a user, which further improves user performance. The mobility/measurement reference signal includes a primary synchronization signal, a secondary synchronization signal, a mediation reference signal for physical broadcast channel demodulation, a beam reference signal, a third synchronization signal, and a CSI reference signal or other newly defined mobility/measurement reference signal in NR.

In one implementation of the present disclosure, the parameter information includes a beam-group identifier; or one or more received signal strength deviation values or received signal quality deviation values.

In this implementation, the parameter information includes the beam-group identifier, or the one or more received signal strength deviation values or received signal quality deviation values. The terminal knows which beams belong to the same beam group according to the beam-group identifier, can divide all beams in each cell into at least one beam group according to the one or more received signal strength deviation values or received signal quality deviation values, and selects, in each beam group, a beam having the strongest received signal strength or the highest received signal quality to calculate cell measure quality or perform measure reporting. Thereby, the fairness of the selection of a target cell can be improved. In one implementation, the deviation value can be given by system information.

Figure 5:
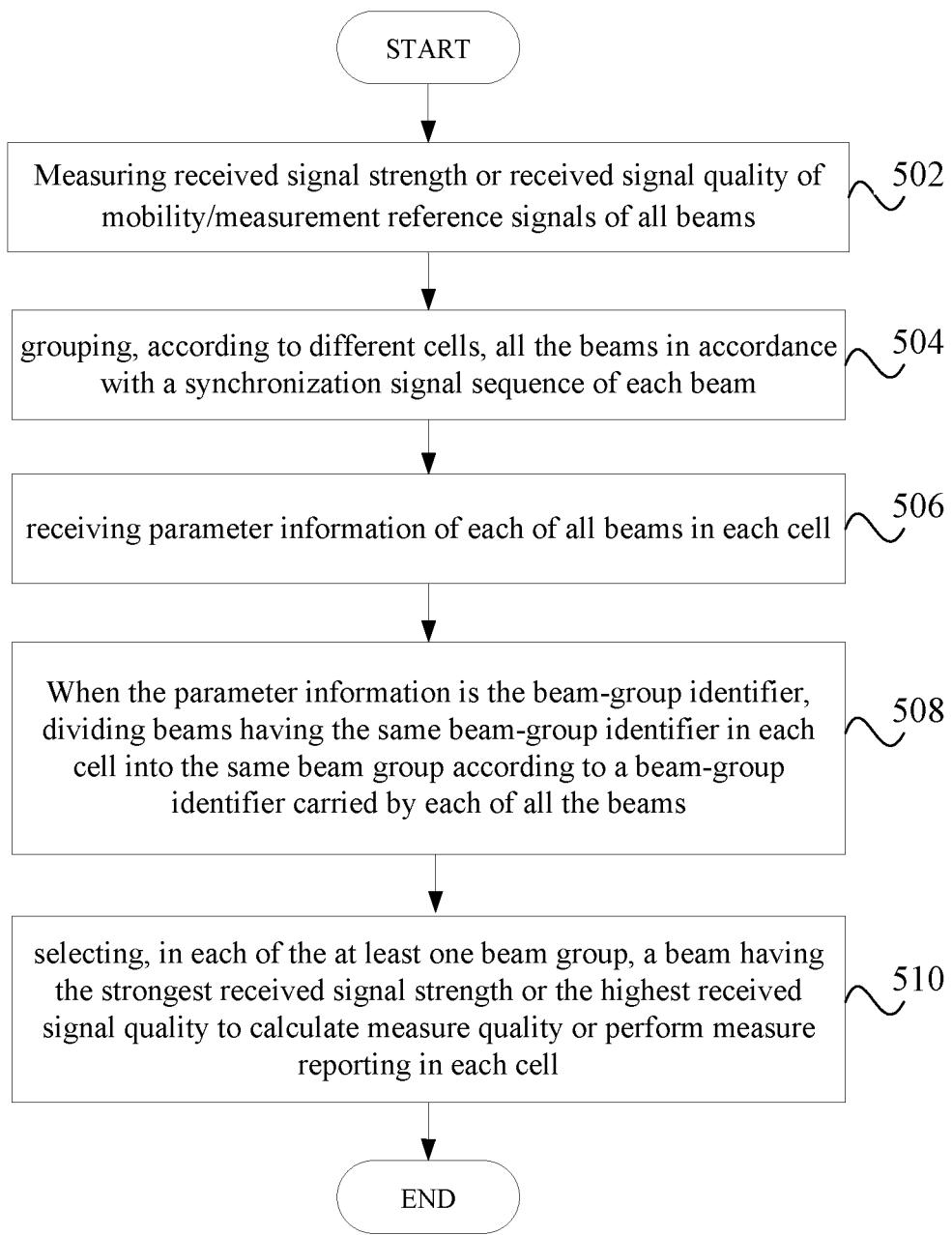
FIG. 5 is a schematic flow diagram illustrating a method for managing beam groups applicable to a terminal according to another implementation of the present disclosure.

FIG. 5 is a schematic flow diagram illustrating a method for managing beam groups applicable to a terminal according to another implementation of the present disclosure.

At 502, received signal strength or received signal quality of mobility/measurement reference signals of all beams is measured.

At 504, according to different cells, all the beams are grouped in accordance with a synchronization signal sequence of each beam.

At 506, parameter information of each of all beams in each cell is received.

At 508, when the parameter information is a beam-group identifier, according to a beam-group identifier carried by each of all the beams, beams having the same beam-group identifier in each cell are divided into the same beam group.

At 510, a beam having the strongest received signal strength or the highest received signal quality in each of the at least one beam group is selected to calculate measure quality or perform measure reporting in each cell.

In this implementation, when the parameter information is the beam-group identifier, the beams having the same beam-group identifier in each cell are divided into the same beam group according to the beam-group identifier carried by each beam. Which beams belong to the same beam group is determined according to the beam-group identifier. One beam having the strongest received beam strength or the highest received signal quality in one beam group is selected to calculate measure quality or perform measure reporting in each cell, which avoids the unfairness in calculating or reporting reference signal strength for multiple beams which have the strongest received signal strength or the highest received signal quality and are directly selected.

Figure 6:
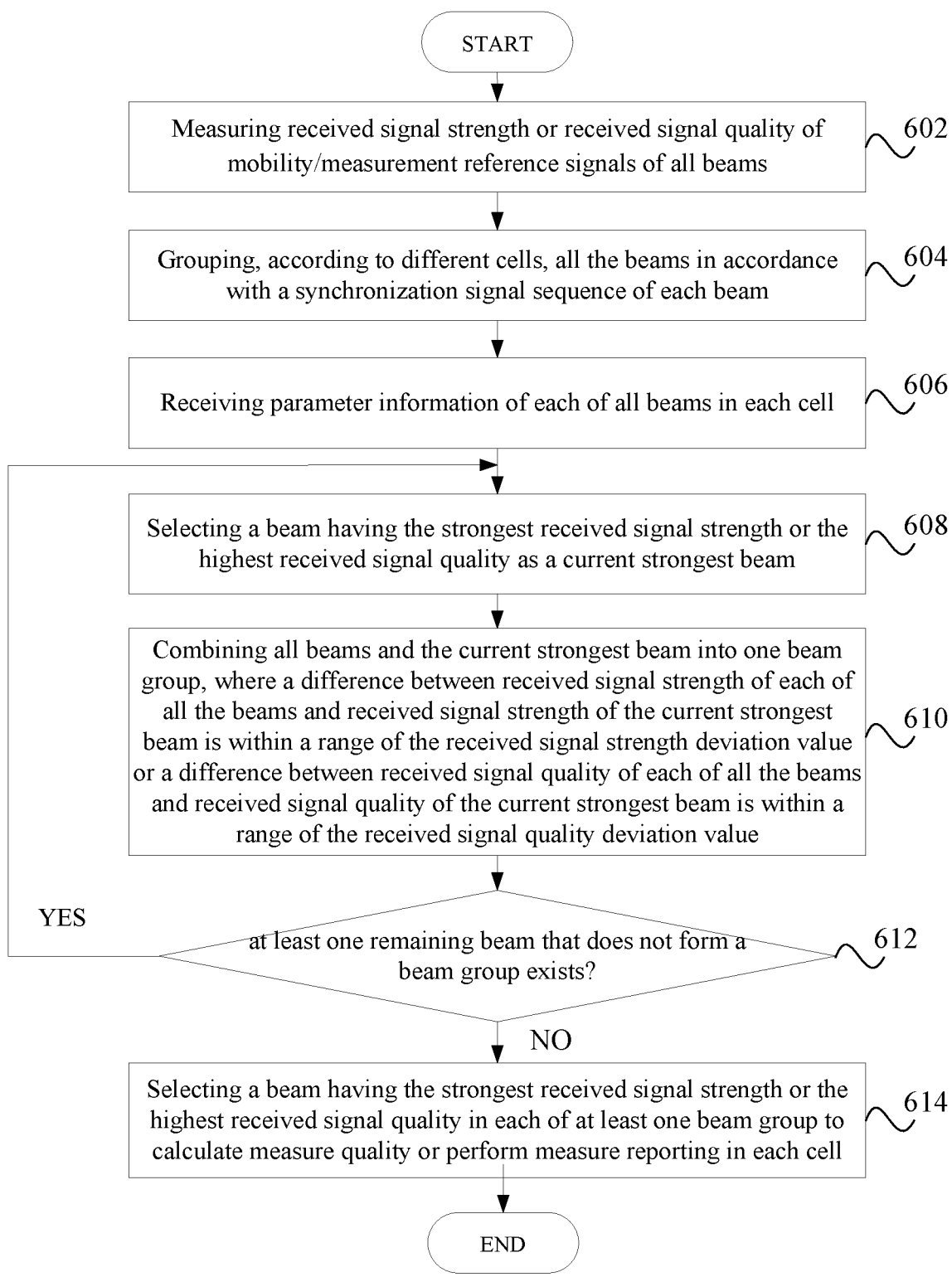
FIG. 6 is a schematic flow diagram illustrating a method for managing beam groups applicable to a terminal according to still another implementation of the present disclosure.

FIG. 6 is a schematic flow diagram illustrating a method for managing beam groups applicable to a terminal according to still another implementation of the present disclosure.

At 602, received signal strength or received signal quality of mobility/measurement reference signals of all beams is measured.

At 604, according to different cells, all the beams are grouped in accordance with a synchronization signal sequence of each beam.

At 606, parameter information of each of all beams in each cell is received.

At 608, when the parameter information is one or more received signal strength deviation values or received signal quality deviation values, a beam having the strongest received signal strength or the highest received signal quality among all beams measured is selected as a current strongest beam.

At 610, all beams and the current strongest beam are combined into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value.

At 612, whether at least one remaining beam that does not form a beam group exists is determined. When at least one remaining beam that does not form a beam group exists, return to operations at 608.

At 614, when no remaining beam that does not form a beam group exists, a beam having the strongest received signal strength or the highest received signal quality in each of at least one beam group is selected to calculate measure quality or perform measure reporting in each cell.

In this implementation, when the parameter information is the one or more received signal strength deviation values or received signal quality deviation values, the beam having the strongest received signal strength or the highest received signal quality among all the beams is selected as the current strongest beam. All beams and the current strongest beam are combined into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value. When at least one ungrouped beam exists, the beam having the strongest received signal strength or the highest received signal quality in the at least one ungrouped beam is selected as the current strongest beam, all beams and the current strongest beam in the at least one ungrouped beam are combined into another beam group, where a difference between received signal strength of each of all the beams and the received signal strength of the current strongest beam in the at least one ungrouped beam is within a range of the received signal strength deviation value or a difference between received signal quality of each of all the beams and the received signal quality of the current strongest beam in the at least one ungrouped beam is within a range of the received signal quality deviation value, and an operation of grouping at least one ungrouped beam is repeated until there is no remaining beam. Because differences between received signal strength or received signal quality of beams in the same beam group are not significant, all beams are divided into several beam groups according to differences between received signal strength or received signal quality of the beams, and the beam having the strongest received signal strength or the highest signal quality is selected from each beam group to calculate cell measure quality or perform measure reporting, which avoids the case where many beams having strong received signal strength or high received signal quality can be selected in a certain cell, or the case where fewer beams having strong received signal strength or high received signal quality can be selected in a certain cell, therefore, a target cell can be selected more fairly, and so a best target cell is selected for the user, which further improves user throughput and reduces delay.

In one implementation of the present disclosure, the received signal strength deviation values or the received signal quality deviation values on the same carrier frequency are the same.

In this implementation, the received signal strength deviation values or the received signal quality deviation values adopted by all base stations on the same carrier frequency are the same, and the received signal strength deviation values or the received signal quality deviation values adopted by all base stations on different carrier frequencies may be different.

Figure 7:
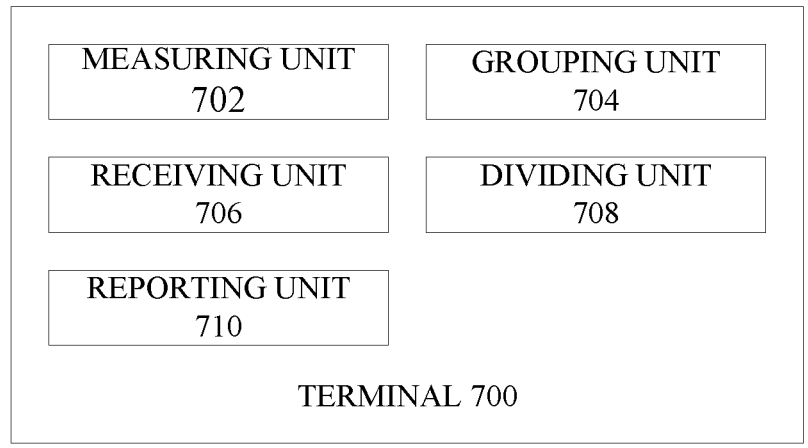
FIG. 7 is a block diagram illustrating a terminal according to an implementation of the present disclosure.

In implementations of a fourth aspect of the present disclosure, a terminal 700 is provided. FIG. 7 is a block diagram illustrating the terminal 700 according to an implementation of the present disclosure.

A measuring unit 702 is configured to measure received signal strength or received signal quality of mobility/measurement reference signals of all beams.

A grouping unit 704 is configured to group, according to different cells, all the beams in accordance with a synchronization signal sequence of each beam.

A receiving unit 706 is configured to receive parameter information of each of all beams in each cell.

A dividing unit 708 is configured to divide, according to the parameter information, all the beams in each cell into at least one beam group.

A reporting unit 710 is configured to select, in each of the at least one beam group, a beam having the strongest received signal strength or the highest received signal quality to calculate measure quality or perform measure reporting in each cell.

According to the terminal 700 provided by the present disclosure, the measuring unit 702 of the terminal 700 measures the received signal strength or the received signal quality of the mobility/measurement reference signals of all beams; the grouping unit 704 of the terminal 700 groups, according to different cells, all the beams in accordance with the synchronization signal sequence of each beam; the receiving unit 706 of the terminal 700 receives parameter information of each of all beams in each cell; the dividing unit 708 of the terminal 700 divides, according to the parameter information, all the beams in each cell into multiple beam groups; and the reporting unit 710 of the terminal 700 selects, in each beam group, the beam having the strongest received signal strength or the highest received signal quality to calculate cell measure quality or perform measure reporting. According to the present disclosure, the beam having the strongest signal strength or the highest received signal quality is selected in the divided beam groups. Further, a target cell can be selected, and cells in which mobility/measurement reference signals are transmitted at different beam widths can fairly participate in an operation of selecting a target cell, and so a best target cell can be selected for a user, which further improves user performance. The mobility/measurement reference signal includes a primary synchronization signal, a secondary synchronization signal, a mediation reference signal for physical broadcast channel demodulation, a beam reference signal, a third synchronization signal, and a CSI reference signal or other newly defined mobility/measurement reference signal in NR.

In one implementation of the present disclosure, the parameter information includes a beam-group identifier; or one or more received signal strength deviation values or received signal quality deviation values.

In this implementation, the parameter information includes the beam-group identifier, or the one or more received signal strength deviation values or received signal quality deviation values. The terminal knows which beams belong to the same beam group according to the beam-group identifier, can divide all beams in each cell into at least one beam group according to the one or more received signal strength deviation values or received signal quality deviation values, and selects, in each beam group, a beam having the strongest received signal strength or the highest received signal quality to calculate cell measure quality or perform measure reporting. Thereby, the fairness of the selection of a target cell can be improved. In one implementation, the deviation value above can be given by system information.

In one implementation of the present disclosure, when the parameter information is a beam-group identifier, the dividing unit 708 is configured to divide beams having the same beam-group identifier in each cell into the same beam group according to a beam-group identifier carried by each of all the beams.

In this implementation, when the parameter information is the beam-group identifier, the dividing unit 708 divides the beams having the same beam-group identifier in each cell into the same beam group according to the beam-group identifier carried by each of all the beams. Which beams belong to the same beam group is determined according to the beam-group identifier. One beam having the strongest received signal strength or the highest received signal quality in one beam group is selected to calculate measure quality or perform measure reporting in each cell, which avoids the unfairness in calculating or reporting reference signal strength for multiple beams which have the strongest received signal strength or the highest received signal quality and are directly selected.

In one implementation of the present disclosure, when the parameter information is one or more received signal strength deviation values or received signal quality deviation values, the dividing unit 708 is configured to: select, among measured beams to-be-measured, the beam having the strongest received signal strength and the highest received signal quality as the current strongest beam; combine all beams and the current strongest beam into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value; select, in at least one remaining beam, a beam having the strongest received signal strength or the highest received signal quality as the current strongest beam, and combine all beams and the current strongest beam in the at least one remaining beam into another beam group, where a difference between received signal strength of each of all the beams and the received signal strength of the current strongest beam in the at least one remaining beam is within a range of the received signal strength deviation value or a difference between received signal quality of each of all the beams and the received signal quality of the current strongest beam in the at least one remaining beam is within a range of the received signal quality deviation value, when the at least one remaining beam that does not form a beam group exists; and repeat this step until there is no remaining beam.

In this implementation, when the parameter information is the one or more received signal strength deviation values or received signal quality deviation values, the dividing unit 708 selects the beam having the strongest received signal strength or the highest received signal quality among all the beams as the current strongest beam. The dividing unit 708 combines all beams and the current strongest beam into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value. When at least one ungrouped beam exists, the dividing unit 708 selects, in the at least one ungrouped beam, the beam having the strongest received signal strength or the highest received signal quality as the current strongest beam, combines all beams and the current strongest beam in the at least one ungrouped beam into another beam group, where a difference between received signal strength of each of all the beams and the received signal strength of the current strongest beam in the at least one ungrouped beam is within a range of the received signal strength deviation value or a difference between received signal quality of each of all the beams and the received signal quality of the current strongest beam in the at least one ungrouped beam is within a range of the received signal quality deviation value, and grouping at least one ungrouped beam is repeated until there is no remaining beam. Because differences between received signal strength or received signal quality of beams in the same beam group are not significant, all beams are divided into several beam groups according to differences between received signal strength or received signal quality of the beams, and a beam having the strongest received signal strength or the highest received signal quality is selected from each beam group to calculate cell measure quality or perform measure reporting, which avoids the case where many beams having strong received signal strength or high received signal quality can be selected in a certain cell, or the case where fewer beams having strong received signal strength or high received signal quality can be selected in a certain cell, therefore, a target cell can be selected more fairly, and so a best target cell is selected for the user, which further improves user throughput and reduces delay.

In one implementation of the present disclosure, the received signal strength deviation values or the received signal quality deviation values on the same carrier frequency are the same.

In this implementation, the received signal strength deviation values or the received signal quality deviation values adopted by all base stations on the same carrier frequency are the same, and the received signal strength deviation values or the received signal quality deviation values adopted by all base stations on different carrier frequencies may be different.

According to specific implementations of the present disclosure, a concept of a beam group is proposed. When selecting beams to participate in an operation of calculating or reporting, only one beam can be selected in each beam group.

Cell-specific: the base station specifies which beams belong to the same beam group. In the case of a certain carrier frequency, if measure quality for each cell is obtained by calculating measurement values of up to N beams or the measurement values of up to N beams can be reported for each cell, the size of each partial coverage area can be obtained by dividing a total coverage area by N. For example, the total coverage area covers 360 degrees, and the measure quality for each cell is obtained by calculating measurement values of six beams at most. Then, a coverage area corresponding to each beam group covers 60 degrees. Downlink transmission content is transmitted to the terminal via at least one beam of at least one beam group carrying the downlink transmission content. The downlink transmission content includes all downlink transmission synchronization signals, reference signals, PBCH, PDCCH, PDSCH, and the like. The synchronization signal includes a primary synchronization signal (PSS), a secondary synchronization signal (SSS), and the like. The reference signal includes a cell specific reference signal, a CSI reference signal, and a user specific reference signal, and the like. In this case, the definitions of beam groups on the same carrier frequency should be the same, that is, partial coverage areas corresponding to beam groups of all base stations on the same carrier frequency each cover 60 degrees, and partial coverage areas correspond to beam groups of all base stations on different carrier frequencies may be different. At this time, which beams belong to the same beam group is notified to a user based on relevant information, where the relevant information may be a beam-group ID, and the relevant information is notified via signals such us one or more of a primary synchronization signal, a secondary synchronization signal, a physical broadcast channel, a beam reference signal, a third synchronization signal, and mobility/measurement reference signal in NR, or is determined according to relative positions of time-frequency resources between the above one or more signals.

UE-specific: at least one beam group is determined by a user according to parameters given by a base station. As an example, all beams measured is sorted by a UE in descending order of signal strength. The strongest beam (i.e., a beam having the strongest signal strength) is first selected. Beams and the strongest beam are combined into a first beam group, where a difference between signal strength of each of the beams and signal strength of the strongest beam is within a range of one deviation value. Except for beams in the first beam group, beams are selected in the same way to form a second beam group, a deviation value involved in each grouping may be different. In this case, the base station needs to inform the terminal of the deviation value. Similarly, deviation values adopted by all base stations on the same carrier frequency are the same, and deviation values adopted by all base stations on different carrier frequencies are different. The deviation value may be a received signal strength deviation value or a received signal quality deviation value.

The present disclosure describes that signal strength of which beams is to be used for participation in an operation of calculating or reporting in the case of multiple beams, so that cells in which mobility/measurement reference signals are transmitted at different beam widths can fairly participate in an operation of selecting a target cell, thereby, a best target cell can be selected for a user, which further improves user performance.

Figure 8:
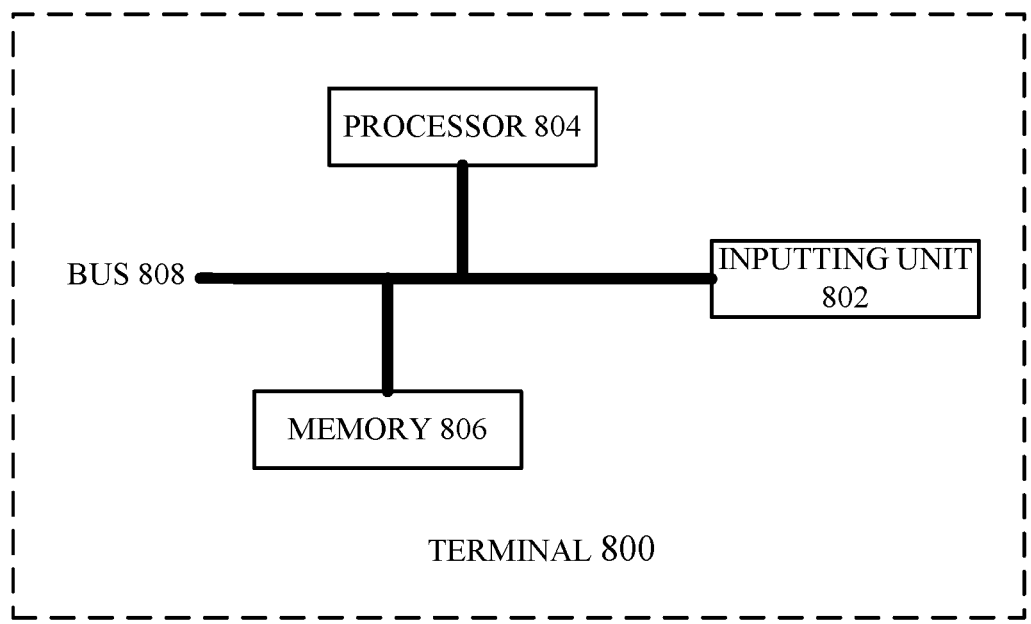
FIG. 8 is a schematic structural diagram illustrating a terminal according to an implementation of the present disclosure.

FIG. 8 is a schematic structural diagram illustrating a terminal 800 according to an implementation of the present disclosure. The terminal 800 includes an inputting unit 802, a processor 804, a memory 806, and a bus 808. The input unit 802, the processor 804, and the memory 806 are coupled via the bus 808. The memory 806 stores computer instructions which, when executed by the processor 804, causes the processor 804 to carry out following actions. Received signal strength or received signal quality of mobility/measurement reference signals of all beams is measured. According to different cells, all the beams are grouped in accordance with a synchronization signal sequence of each beam. Parameter information of each of all beams in each cell is received. According to the parameter information, all the beams in each cell are divided into at least one beam group. A beam having the strongest received signal strength or the highest received signal quality in each of the at least one beam group is selected to calculate measure quality or perform measure reporting in each cell.

In a particular implementation of the present disclosure, the computer instructions which, when executed by the processor 804 of the terminal 800, causes the processor 804 to carry out following actions. Received signal strength or received signal quality of mobility/measurement reference signals of all beams is measured. According to different cells, all the beams are grouped in accordance with a synchronization signal sequence of each beam. Parameter information of each of all beams in each cell is received. When the parameter information is a beam-group identifier, according to a beam-group identifier carried by each of all the beams, beams having the same beam-group identifier in each cell are divided into the same beam group. A beam having the strongest received signal strength or the highest received signal quality in each of the at least one beam group is selected to calculate measure quality or perform measure reporting in each cell.

In a particular implementation of the present disclosure, the computer instructions which, when executed by the processor 804 of the terminal 800, causes the processor 804 to carry out following actions. Received signal strength or received signal quality of mobility/measurement reference signals of all beams is measured. According to different cells, all the beams are grouped in accordance with a synchronization signal sequence of each beam. Parameter information of each of all beams in each cell is received. When the parameter information is one or more received signal strength deviation values or received signal quality deviation values, a beam having the strongest received signal strength or the highest received signal quality among all beams measured is selected as a current strongest beam. All beams and the current strongest beam are combined into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value. Whether at least one remaining beam that does not form a beam group exists is determined. When at least one remaining beam that does not form a beam group exists, a beam having the strongest received signal strength or the highest received signal quality among all beams (i.e., remaining beams) is selected as a current strongest beam. All beams and the current strongest beam are combined into one beam group, where a difference between received signal strength of each of all the beams and received signal strength of the current strongest beam is within a range of the received signal strength deviation value or a difference between received signal quality of each of all the beams and received signal quality of the current strongest beam is within a range of the received signal quality deviation value. An operation of grouping is repeated until there is no remaining beam that does not form a beam group. When no remaining beam that does not form a beam group exists, a beam having the strongest received signal strength or the highest received signal quality in each of at least one beam group is selected to calculate measure quality or perform measure reporting in each cell.

In Specification, the terms "one implementation", "some implementations", "specific implementations", and the like referred to herein mean that specific features, structures, materials, or characteristics described in connection with the implementation or example may be contained in at least one implementation or example of the disclosure. In Specification, the schematic representation of the above terms does not necessarily refer to the same implementation or example. Furthermore, the specific features, structures, materials, or characteristics described may be combined with any one or more implementations or examples in a suitable manner.

The foregoing description merely depicts some exemplary implementations of the disclosure, which however are not intended to limit the disclosure. It will be apparent to those skilled in the art that various modifications and changes can be made in the disclosure. Any modifications, equivalent substitutions, or improvements made thereto without departing from the spirits and principles of the disclosure shall all be encompassed within the protection of the disclosure.

What is claimed is:

1. A method for managing beam groups, applicable to a terminal, the method comprising:
measuring received signal strength or received signal quality of mobility/measurement reference signals of all beams;
grouping, according to different cells, all the beams in accordance with a synchronization signal sequence of each beam;
receiving parameter information of each of all beams in each cell;
assigning, according to the parameter information, all the beams in each cell into at least one beam group; and
selecting, in each of the at least one beam group, a beam having the strongest received signal strength or the highest received signal quality to calculate measured quality or perform measurement reporting in each cell,
wherein the parameter information comprises at least one of received signal strength deviation values or received signal quality deviation values, and the at least one of the received signal strength deviation values or the received signal quality deviation values are the same on the same carrier frequency.

2. The method of claim 1, wherein the parameter information further comprises:
a beam-group identifier.

3. The method of claim 2, wherein the parameter information comprises the beam-group identifier, and dividing, according to the parameter information, all the beams in each cell into the at least one beam group comprises:
assigning beams having the same beam-group identifier in each cell into the same beam group according to a beam-group identifier carried by each of all the beams.

4. The method of claim 1, wherein assigning, according to the parameter information, all the beams in each cell into the at least one beam group comprises:
selecting, among all beams measured, a beam having the strongest received signal strength or the highest received signal quality as a current strongest beam; and
combining all first beams and the current strongest beam into one beam group, wherein a difference between received signal strength of each of all the first beams and received signal strength of the current strongest beam is within a range of the received signal strength deviation value or a difference between received signal quality of each of all the first beams and received signal quality of the current strongest beam is within a range of the received signal quality deviation value.

5. The method of claim 4, wherein assigning, according to the parameter information, all the beams in each cell into the at least one beam group further comprises:
based on a determination that at least one beam remains unassigned, selecting, from the at least one remaining beam, a beam having the strongest received signal strength or the highest received signal quality as the current strongest beam.

6. A terminal, comprising a processor, and a memory, wherein the memory stores instructions executable by the processor; and the instructions, when executed by the processor, cause the processor to:
measure received signal strength or received signal quality of mobility management measurement reference signals of all beams;
group, according to different cells, all the beams in accordance with a synchronization signal sequence of each beam;
receive parameter information of each of all beams in each cell;
assign, according to the parameter information, all the beams in each cell into at least one beam group; and
select, in each of the at least one beam group, a beam having the strongest received signal strength or the highest received signal quality to calculate measured quality or perform measurement reporting in each cell,
wherein the parameter information is at least one of received signal strength deviation values or received signal quality deviation values, and the at least one of the received signal strength deviation values or the received signal quality deviation values are the same on the same carrier frequency.

7. The terminal of claim 6, wherein the parameter information further comprises:
a beam-group identifier.

8. The terminal of claim 7, wherein the parameter information comprises the beam-group identifier, and the instructions, when executed by the processor, cause the processor to:
assign beams having the same beam-group identifier in each cell into the same beam group according to a beam-group identifier carried by each of all the beams.

9. The terminal of claim 6, wherein the instructions caused the processor to assign, according to the parameter information, all the beams in each cell into the at least one beam group further cause the processor to:
select, among all beams measured, a beam having the strongest received signal strength or the highest received signal quality as a current strongest beam; and
combine all first beams and the current strongest beam into one beam group, wherein a difference between received signal strength of each of all the first beams and received signal strength of the current strongest beam is within a range of the received signal strength deviation value or a difference between received signal quality of each of all the first beams and received signal quality of the current strongest beam is within a range of the received signal quality deviation value.

10. The terminal of claim 9, wherein the instructions caused the processor to assign, according to the parameter information, all the beams in each cell into the at least one beam group further cause the processor to:
based on a determination that at least one beam remains unassigned, select, from the at least one remaining beam, a beam having the strongest received signal strength or the highest received signal quality as the current strongest beam.

* * * * *